US012567289B2

(12) United States Patent
Hirano

(10) Patent No.: US 12,567,289 B2
(45) Date of Patent: Mar. 3, 2026

(54) VEHICLE CONTROL SYSTEM AND VEHICLE CONTROL DEVICE

(71) Applicant: TOYOTA JIDOSHA KABUSHIKI KAISHA, Toyota (JP)

(72) Inventor: Hiroshi Hirano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/589,867

(22) Filed: Feb. 28, 2024

(65) Prior Publication Data

US 2024/0331455 A1 Oct. 3, 2024

(30) Foreign Application Priority Data

Mar. 31, 2023 (JP) ................................. 2023-057152

(51) Int. Cl.
*G07C 5/00* (2006.01)
*H04L 12/40* (2006.01)
(52) U.S. Cl.
CPC .............. *G07C 5/008* (2013.01); *H04L 12/40* (2013.01); *H04L 2012/40215* (2013.01); *H04L 2012/40273* (2013.01)
(58) Field of Classification Search
CPC ..................................................... G07C 5/008
See application file for complete search history.

(56) References Cited

U.S. PATENT DOCUMENTS 11,208,111 B2 * 12/2021 Chi ........................ G05D 1/228

FOREIGN PATENT DOCUMENTS

| JP | H02-220167 A | 9/1990 | |
| JP | 2001-342889 A | 12/2001 | |
| WO | WO-2021197822 A1 * | 10/2021 | ......... H04L 63/0209 |

OTHER PUBLICATIONS

Loshin, P. (Oct. 21, 2021). What is full-duplex?. TechTarget. (Year: 2021).*

* cited by examiner

*Primary Examiner* — Hitesh Patel
*Assistant Examiner* — Tabitha Kress
(74) *Attorney, Agent, or Firm* — Oliff PLC

(57) ABSTRACT

A control system for a vehicle includes a first control device and a second control device that receives data transmitted by the first control device and determines a communication anomaly of the data. When the first control device starts transmission of data to the second control device via the first transmission path, the first control device transmits a signal serving as a trigger for starting determination of a communication anomaly to the second control device via a second transmission path different from the first transmission path. Upon receiving the signal from the first processing circuitry, the second control device starts determination of a communication anomaly.

9 Claims, 2 Drawing Sheets

VEHICLE CONTROL SYSTEM AND VEHICLE CONTROL DEVICE

RELATED APPLICATION

The present application claims priority of Japanese Patent Application No. 2023-057152 filed on Mar. 31, 2023, the disclosure of which is hereby incorporated by reference herein in its entirety.

BACKGROUND

1. Field

The present disclosure relates to a control system for a vehicle and a control device for a vehicle.

2. Description of Related Art

Japanese Laid-Open Patent Publication No. 2001-342889 discloses an example of a control device that determines whether or not the vehicle is in a state suitable for performing anomaly detection based on information received from the outside of the control device. When it is determined that the vehicle is in the suitable state, the control device performs the anomaly detection on the vehicle.

In the technique disclosed in the above patent document, the anomaly detection is not performed until it is determined that the vehicle is in a state suitable for the anomaly detection. This results in a delay before the anomaly detection is started. If such a delay occurs at the time of starting anomaly determination of data communication, the communication anomaly determination may not be promptly started.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure provides a control system for a vehicle. The control system includes a first control device configured to transmit data acquired from outside the first control device, and a second control device configured to receive the data transmitted by the first control device and determine a communication anomaly of the data. The first control device includes first processing circuitry configured to transmit the data to the second control device via a first transmission path, and transmit a signal to the second control device via a second transmission path that differs from the first transmission path when transmission of the data is started. The signal is used as a trigger for starting determination of the communication anomaly. The second control device includes second processing circuitry configured to start determination of the communication anomaly when the signal is received from the first processing circuitry.

One aspect of the present disclosure provides a control device configured to be mounted on a vehicle and determine a communication anomaly of data acquired from outside the control device. The control device includes processing circuitry configured to receive the data via a first transmission path, receive a signal, which is used as a trigger for starting determination of the communication anomaly, via a second transmission path that differs from the first transmission path when transmission of the data via the first transmission path is started, and start determination of the communication anomaly when the signal is received.

One aspect of the present disclosure provides a control device configured to be mounted on a vehicle and transmit a signal that is used as a trigger for starting determination of a communication anomaly of data acquired from outside the control device. The control device includes processing circuitry configured to transmit the data via a first transmission path, and transmit the signal via a second transmission path that differs from the first transmission path when transmission of the data is started.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a vehicle control system and a vehicle control device will be described with reference to the drawings.

Configuration of Control System

Figure 1:
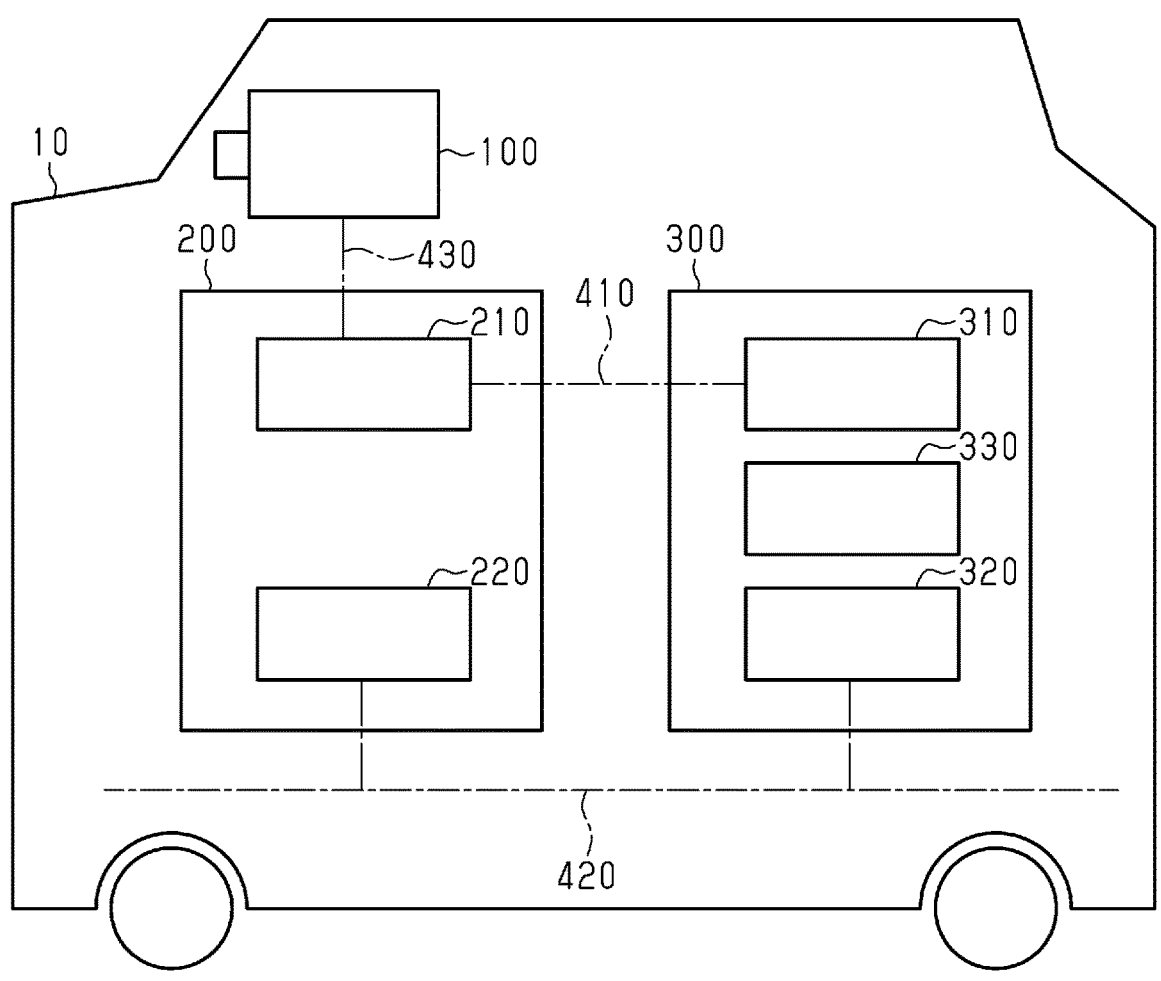
FIG. 1 is a diagram schematically illustrating a configuration of an information processing system according to an embodiment.

As shown in FIG. 1, a vehicle 10 includes an in-vehicle camera 100, a driving monitoring-electronic control unit 200 (DM-ECU), and an advanced drive extension-electronic control unit 300 (ADX-ECU). The DM-ECU 200 is a so-called driving recorder.

The in-vehicle camera 100 captures an image of the surroundings of the vehicle 10.

Each of the DM-ECU 200 and the ADX-ECU 300 is a computer including a central processing unit (CPU), a memory, an input interface, an output interface, and the like. The CPU executes a program stored in the memory to perform various types of system control.

The DM-ECU 200 is a control device and transmits the video captured by the in-vehicle camera 100 to the ADX- ECU 300. Image data captured by the in-vehicle camera 100 corresponds to data acquired by the DM-ECU 200 from the outside.

The ADX-ECU 300 is a control device different from the DM-ECU 200. The ADX-ECU 300 receives the image data transmitted by the DM-ECU 200 and determines the communication anomaly of the received image data.

The central processing unit of the DM-ECU 200 realizes functions as a transmission unit 210 and a notification unit 220 by executing a program stored in the memory.

The transmission unit 210 and the in-vehicle camera 100 are connected by a communication line 430.

The transmission unit 210 transmits the captured data of the in-vehicle camera 100 to a first reception unit 310 described below via a first transmission path 410. The communication standard of the first transmission path 410 is, for example, a communication standard using low voltage differential signaling (LVDS).

When the transmission unit 210 starts transmission of the image data, the notification unit 220 generates a transmission start signal which is a signal serving as a trigger for starting determination of the communication anomaly. Then, the notification unit 220 transmits the transmission start signal to the ADX-ECU 300 via a second transmission path 420 that differs from the first transmission path 410. The communication standard of the second transmission path 420 is, for example, a controller area network (CAN).

The CPUs of the ADX-ECU 300 realize functions as the first reception unit 310, a second reception unit 320, and a determination unit 330 by executing programs stored in the memories.

The first reception unit 310 receives the image data transmitted from the transmission unit 210 via the first transmission path 410.

The second reception unit 320 receives the transmission start signal via the second transmission path 420.

The determination unit 330 determines a communication anomaly of the image data received from the transmission unit 210. That is, it is determined whether or not there is an anomaly in communication of image data performed via the first transmission path 410. The communication anomaly determined here is disconnection of the first transmission path 410, disturbance of the transfer rate of image data, or the like.

Process Executed by Control System

Figure 2:
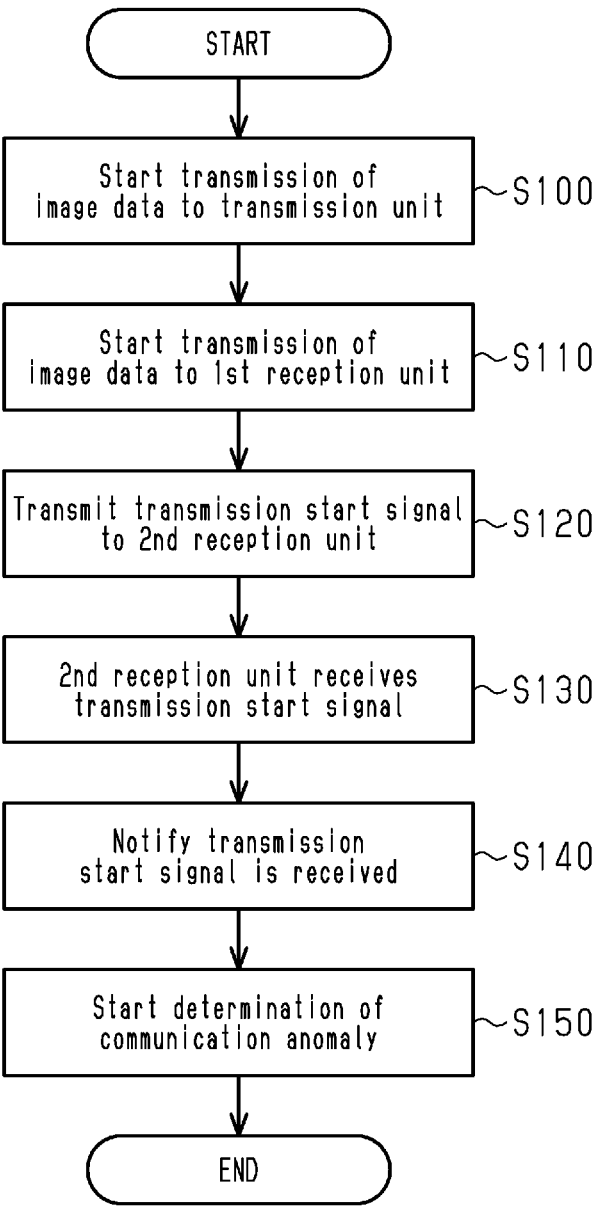
FIG. 2 is a flowchart showing a procedure of a process executed by the information processing system.

FIG. 2 shows a procedure of a process executed by the control system of the vehicle 10. This process is started when the ignition switch of the vehicle 10 is turned on and activation of each ECU and the in-vehicle camera 100 is completed. In the following description, the step number of each process is represented by a number preceded by "S".

In the process shown in FIG. 2, first, the in-vehicle camera 100 starts image data transmission to the transmission unit 210 (S100).

Next, the transmission unit 210 starts image data transmission to the first reception unit 310 (S110).

Next, the notification unit 220 transmits the generated transmission start signal to the second reception unit 320 (S120).

Next, the second reception unit 320 receives the transmission start signal transmitted by the notification unit 220 (S130).

Next, the second reception unit 320 notifies the determination unit 330 that the transmission start signal has been received (S140).

Next, when the reception of the transmission start signal is notified, the determination unit 330 starts the above-described determination of the communication anomaly (S150).

Then, the present process ends.

Operation and Advantages

The operation and advantages of the present embodiment will now be described.

(1) The DM-ECU 200 is mounted on the vehicle 10 and transmits image data acquired from the in-vehicle camera 100, which is a device provided outside the DM-ECU 200. Further, the ADX-ECU 300 is mounted on the vehicle 10 and receives the image data transmitted by the DM-ECU 200 and determines a communication anomaly of the image data. The DM-ECU 200 includes a transmission unit 210 that transmits the image data to the ADX-ECU 300 via the first transmission path 410. The DM-ECU 200 further includes the notification unit 220 that transmits a transmission start signal, which is used as a trigger for starting determination of a communication anomaly, to the ADX-ECU 300 via the second transmission path 420 when the transmission unit 210 starts transmission of the image data. The ADX-ECU 300 includes the determination unit 330 that starts determination of a communication anomaly when the transmission start signal is received from the notification unit 220. Thus, when transmission of image data is started via the first transmission path 410, the transmission start signal, which is used as a trigger for starting determination of a communication anomaly, is transmitted via the second transmission path 420. As described above, the image data and the transmission start signal, which is used as a trigger for starting determination of a communication anomaly, are transmitted via different transmission paths. This allows the determination of a communication anomaly to be started in accordance with a start of transmission of image data. Thus, the determination of a communication anomaly is promptly started.

(2) The ADX-ECU 300, which is mounted on the vehicle 10 and determines a communication anomaly of image data, includes the first reception unit 310 that receives the image data via the first transmission path 410. The ADX-ECU 300 also includes the second reception unit 320 that receives the transmission start signal, which is used as a trigger for starting determination of a communication anomaly, via the second transmission path 420, when transmission of image data is started via the first transmission path 410. The ADX-ECU 300 further includes the determination unit 330 that starts determination of a communication anomaly when the second reception unit 320 receives the transmission start signal. Thus, when transmission of image data is started via the first transmission path 410, the transmission start signal, which is used as a trigger for starting determination of a communication anomaly, is received via the second transmission path 420. As described above, the image data and the transmission start signal, which is used as a trigger for starting determination of a communication anomaly, are transmitted via different transmission paths. This allows the determination of a communication anomaly to be started in accordance with a start of transmission of image data. Thus, the determination of a communication anomaly is promptly started.

(3) The DM-ECU 200, which is mounted in the vehicle 10 and transmits the transmission start signal used as a trigger for starting determination of a communication anomaly in image data, includes the transmission unit 210 that transmits the image data via the first transmission path 410. The DM-ECU 200 further includes the notification unit 220 that transmits the transmission start signal via the second transmission path 420 when the transmission unit 210 starts transmission of image data. Thus, when the transmission of image data is started via the first transmission path 410, the transmission start signal, which is used as a trigger for starting determination of a communication anomaly, is transmitted via the second transmission path 420. As described above, the image data and the transmission start signal, which is used as a trigger for starting determination of a communication anomaly, are transmitted via different transmission paths. The transmission of the image data via the first transmission path 410 and the transmission of the transmission start signal via the second transmission path 420 are executed substantially simultaneously. This allows the determination of a communication anomaly to be started in accordance with a start of transmission of image data. Thus, the determination of a communication anomaly is promptly started.

Modified Examples

The above embodiment may be modified as described below. The above-described embodiment and the following modifications can be combined as long as the combined modifications remain technically consistent with each other.

In the embodiment described above, the data acquired from the outside is image data captured by the in-vehicle camera 100. However, the data acquired from the outside may be other data.

In the above embodiment, the first transmission path 410 is designed based on a communication standard using low voltage differential signaling (LVDS). However, the first transmission path 410 may be designed based on another communication standard.

In the embodiment described above, the second transmission path 420 is designed based on a communication path using CAN. However, the second transmission path 420 may be designed based on a communication path using another communication standard.

In the above embodiment, each of the DM-ECU 200 and the ADX-ECU 300 executes software processing. However, this is merely exemplary. For example, at least a part of the software processing executed in the above-described embodiment may be executed by a dedicated hardware circuit (for example, an ASIC or the like). That is, each of the DM-ECU 200 and the ADX-ECU 300 may have any one of the following configurations (a) to (c). Configuration (a) includes a processing device for executing all processes in accordance with a program and a program storage device such as a ROM for storing the program. That is, the configuration includes a software execution device. Configuration (b) includes a processing device that executes a part of processing according to a program, a program storage device, and a dedicated hardware circuit that executes the remaining processing. Configuration (c) includes a dedicated hardware circuit for executing all processes. There may be a plurality of software execution devices and/or dedicated hardware circuits. That is, the above-described process may be executed by processing circuitry including at least one of a software execution device and a dedicated hardware circuit. The processing circuitry may include a plurality of software execution devices and a plurality of dedicated hardware circuits. Program storage devices or computer-readable media may include any available media storage device that can be accessed by a general purpose or special purpose computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A control system for a vehicle, the control system comprising:

a first electronic control unit configured to receive data generated by an in-vehicle device located in the vehicle outside of the first electronic control unit and then transmit the data from the first electronic control unit;

a second electronic control unit configured to receive the data transmitted by the first electronic control unit and determine a communication anomaly of the data;

a first transmission path connected between the first electronic control unit and the second electronic control unit; and a second transmission path that differs from the first transmission path and is connected between the first electronic control unit and the second electronic control unit, wherein the first electronic control unit is configured to:

transmit the data to the second electronic control unit via the first transmission path; and transmit a transmission start signal to the second electronic control unit via the second transmission path when transmission of the data via the first transmission path is started, the transmission start signal being used as a trigger by the second electronic control unit for starting determination of the communication anomaly, and the second electronic control unit is configured to start the determination of the communication anomaly when the transmission start signal is received by the second electronic control unit from the first electronic control unit, and the second electronic control unit determines that there is the communication anomaly by determining whether there has been at least one of (i) disconnection of the first transmission path and (ii) disturbance of a transfer rate of the data via the first transmission path.

2. An electronic control unit configured to be mounted on a vehicle and determine a communication anomaly of data generated by an in-vehicle device located in the vehicle outside the electronic control unit and transmitted to the electronic control unit by a different electronic control unit, the electronic control unit being further configured to:

receive the data from the different electronic control unit via a first transmission path;

receive a transmission start signal from the different electronic control unit via a second transmission path that differs from the first transmission path when transmission of the data via the first transmission path is started, the transmission start signal being used as a trigger for starting determination of the communication anomaly; and start determination of the communication anomaly when the transmission start signal is received via the second transmission path, the electronic control unit determining that there is the communication anomaly by determining whether there has been at least one of (i) disconnection of the first transmission path and (ii) disturbance of a transfer rate of the data via the first transmission path.

3. An electronic control unit configured to be mounted on a vehicle and receive data generated by an in-vehicle device located in the vehicle outside the electronic control unit, the electronic control unit being further configured to:

transmit the data received from the in-vehicle device to a different electronic control unit of the vehicle via a first transmission path; and transmit a transmission start signal via a second transmission path that differs from the first transmission path when transmission of the data via the first transmission path is started by the electronic control unit, wherein the different electronic control unit determines that there is the communication anomaly by determining whether there has been at least one of (i) disconnection of the first transmission path and (ii) disturbance of a transfer rate of the data via the first transmission path.

4. The electronic control unit according to claim 3, wherein the electronic control unit is configured to simultaneously transmit the data via the first transmission path and transmit the transmission start signal via the second transmission path.

5. The control system according to claim 1, wherein the first electronic control unit is configured to simultaneously transmit the data via the first transmission path and transmit the transmission start signal via the second transmission path.

6. The control system according to claim 1, wherein the in-vehicle device is an in-vehicle camera that captures an image of surroundings of the vehicle, and the data is image data.

7. The control system according to claim 1, wherein the first transmission path uses a communication standard that is different from a communication standard used by the second transmission path.

8. The control system according to claim 1, wherein the first transmission path uses a low voltage differential signaling (LVDS) communication standard and the second transmission path uses a controller area network (CAN) communication standard.

9. The control system according to claim 1, wherein the first electronic control unit is a driving monitoring electronic control unit, and the second electronic control unit is an advanced drive extension electronic control unit.

\* \* \* \* \*